United States Patent
Rucker (10) Patent No.: US 9,926,029 B2
(45) Date of Patent: Mar. 27, 2018

(54) MAGNETIC PURSE SYSTEM

(71) Applicant: Lashundra Rucker, Fuguay Varina, NC (US)

(72) Inventor: Lashundra Rucker, Fuguay Varina, NC (US)

(*) Notice: Subject to any disclaimer, the term of this patent is extended or adjusted under 35 U.S.C. 154(b) by 0 days.

(21) Appl. No.: 15/397,287

(22) Filed: Jan. 3, 2017

(65) Prior Publication Data

US 2017/0190372 A1   Jul. 6, 2017

Related U.S. Application Data

(60) Provisional application No. 62/274,767, filed on Jan. 4, 2016.

(51) Int. Cl.
| | | |
|---|---|---|
| *B62J 9/00* | (2006.01) | |
| *A45C 13/10* | (2006.01) | |
| *A45C 9/00* | (2006.01) | |
| *B60R 11/00* | (2006.01) | |
| *A45C 3/06* | (2006.01) | |
| *A45C 3/00* | (2006.01) | |

(52) U.S. Cl.
CPC .............. *B62J 9/008* (2013.01); *A45C 9/00* (2013.01); *A45C 13/1069* (2013.01); *A45C 3/06* (2013.01); *A45C 2003/005* (2013.01); *A45C 2009/007* (2013.01); *B60R 2011/0057* (2013.01)

(58) Field of Classification Search
CPC .......................... B62J 9/008; B60R 2011/0057
USPC ............ 224/607, 610, 413; 150/110; D3/246
See application file for complete search history.

(56) References Cited

U.S. PATENT DOCUMENTS

| | | | | |
|---|---|---|---|---|
| D72,178 S | * | 3/1927 | Methot ......................... | 150/110 |
| 2,671,486 A | * | 3/1954 | Shaw ....................... | A45C 3/04 224/264 |
| 2,788,040 A | * | 4/1957 | Hullweck .............. | A45C 13/18 150/110 |
| 3,053,005 A | * | 9/1962 | Byers ..................... | A01K 97/20 224/610 |
| 3,804,233 A | * | 4/1974 | Gregg, Jr. ............. | B60N 3/103 206/387.15 |
| 4,059,207 A | | 11/1977 | Jackson et al. | |
| 4,066,196 A | | 1/1978 | Jackson et al. | |
| 4,068,859 A | * | 1/1978 | Dittman ................... | B62J 11/00 224/413 |
| 4,303,184 A | | 12/1981 | Kloth | |
| 4,359,233 A | | 11/1982 | Jackson et al. | |
| 4,469,256 A | * | 9/1984 | McEwen .................. | B62J 9/008 224/413 |
| 4,849,272 A | * | 7/1989 | Haney ...................... | B25H 5/00 280/770 |
| D307,733 S | * | 5/1990 | Kushitani .................... | D12/409 |
| 4,974,765 A | * | 12/1990 | Marchetto .................. | B62J 7/02 224/275 |

(Continued)

*Primary Examiner* — Justin Larson (57) ABSTRACT

A magnetic purse system includes a vehicle that has a gas tank. The gas tank is comprised of a magnetic material. A purse is provided to contain objects. The purse includes a pair of wings and the purse has an electromagnetic shield. The purse is selectively positioned on the gas tank when the vehicle is ridden. A plurality of magnets is provided and each of the magnets is coupled to the purse and each of the wings. Each of the magnets magnetically engages the gas tank when the purse is positioned on the gas tank. In this way the purse is stored when the vehicle is driven.

8 Claims, 6 Drawing Sheets

(56) References Cited

U.S. PATENT DOCUMENTS

| | | | |
|---|---|---|---|
| D314,539 S * | 2/1991 | Swanner | D12/421 |
| 5,001,779 A * | 3/1991 | Eggert | B60R 11/02 |
| | | | 224/413 |
| 5,511,822 A * | 4/1996 | Wolanski | B62J 25/00 |
| | | | 150/167 |
| D370,123 S * | 5/1996 | Klinger | D3/231 |
| D371,537 S | 7/1996 | Jennings | |
| D381,807 S * | 8/1997 | Pickle | D12/421 |
| 5,664,716 A | 9/1997 | Nuckolls | |
| 5,897,040 A * | 4/1999 | Ward | B60R 11/0241 |
| | | | 224/183 |
| D441,191 S * | 5/2001 | Vazquez | D3/290 |
| 6,305,590 B1 | 10/2001 | Hayes | |
| 6,484,911 B1 * | 11/2002 | Doler | A45C 7/0063 |
| | | | 190/105 |
| D466,298 S * | 12/2002 | Vazquez | D3/287 |
| 6,663,128 B2 * | 12/2003 | Dichter | B62J 23/00 |
| | | | 280/288.4 |
| 6,783,040 B2 * | 8/2004 | Batchelor | B62J 9/008 |
| | | | 224/406 |
| 7,198,512 B1 * | 4/2007 | Swiatek | B62J 9/008 |
| | | | 224/902 |
| 7,389,870 B2 * | 6/2008 | Slappay | A45F 5/00 |
| | | | 206/305 |
| D618,913 S * | 7/2010 | Helmhout | D3/318 |
| D690,509 S * | 10/2013 | Guichot | D3/246 |
| 9,038,679 B2 * | 5/2015 | Marquez-Bottome | A45C 13/002 |
| | | | 150/103 |
| 9,308,976 B2 * | 4/2016 | Peterson | H01F 7/00 |
| 2006/0021684 A1 * | 2/2006 | DeCoro, III | A45C 3/08 |
| | | | 150/105 |
| 2007/0125931 A1 * | 6/2007 | Slappay | A45F 5/00 |
| | | | 248/683 |
| 2008/0156833 A1 * | 7/2008 | Espiritu | A45C 13/1069 |
| | | | 224/236 |
| 2008/0196802 A1 * | 8/2008 | Carlevale | A45C 1/024 |
| | | | 150/111 |

\* cited by examiner

MAGNETIC PURSE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to purse devices and more particularly pertains to a new purse device for selectively retaining a purse on a gas tank of a vehicle.

BRIEF SUMMARY OF THE INVENTION

An embodiment of the disclosure meets the needs presented above by generally comprising a vehicle that has a gas tank. The gas tank is comprised of a magnetic material. A purse is provided to contain objects. The purse includes a pair of wings and the purse has an electromagnetic shield. The purse is selectively positioned on the gas tank when the vehicle is ridden. A plurality of magnets is provided and each of the magnets is coupled to the purse and each of the wings. Each of the magnets magnetically engages the gas tank when the purse is positioned on the gas tank. In this way the purse is stored when the vehicle is driven.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new purse device embodying the principles and concepts of an embodiment of the disclosure and generally designated by the reference numeral 10 will be described.

As best illustrated in FIGS. 1 through 6, the magnetic purse system 10 generally comprises a vehicle 12 that has a gas tank 14. The gas tank 14 has an outer wall 16 and the outer wall 16 has a top side 18, a first lateral side 20 and a second lateral side 22. Moreover, the gas tank 14 is comprised of a magnetic material such as steel or the like. The vehicle 12 may be a motorcycle, a quad or any other vehicle 12 that has an exposed gas tank with respect to a user.

A purse 24 is provided and the purse 24 may contain objects. The purse 24 includes a pair of wings 26 and the purse 24 has an electromagnetic shield 28. The purse 24 is selectively positioned on the gas tank 14 when the vehicle 12 is ridden. The purse 24 has an outer surface 30, an inner surface 32 and a top end 34 and the top end 34 is open to access an interior of the purse 24. The outer surface 30 has a front side 36, a back side 35 a first lateral side 38 and a second lateral side 40. A pocket 41 is coupled to the back side 35 of the purse to contain objects.

Each of the wings 26 is foldably coupled to and extends outwardly from an associated one of the first lateral side 38 and the second lateral side 40 of the purse 24. Each of the wings 26 is selectively positioned in a deployed position having each of the wings 26 extending laterally away from the purse 24. Moreover, each of the wings 26 abuts an associated one of the first lateral side 20 and the second lateral side 22 of the gas tank 14 when the purse 24 is positioned on the top side 18 of the gas tank 14. Each of the wings 26 is selectively positioned in a stored position having each of the wings 26 lying on the front side 36 of the purse 24. Each of the wings 26 has a distal end 42 with respect to the purse 24, a first surface 44 and a second surface 45. Additionally, the pair of wings 26 includes a first wing 46 and a second wing 48.

A plurality of magnets 50 is provided and each of the magnets 50 is coupled to the purse 24. Each of the magnets 50 magnetically engages the gas tank 14 when the purse 24 is positioned on the gas tank 14. In this way the purse 24 is stored when the vehicle 12 is driven. The plurality of magnets 50 includes a set of first magnets 52, a set of second magnets 54 and a set of third magnets 56. Each of the first magnets 52 is positioned on the outer surface 30 corresponding to the front side 36 of the purse 24. Each of the second magnets 54 is positioned on the first surface 44 corresponding to the first wing 46. And finally, each of the third magnets 56 is positioned on the first surface 44 corresponding to the second wing 48.

A liner 58 is provided and the liner 58 is coupled to the purse 24. The liner 58 is positioned on the inner surface 32 of the purse 24 and the liner 58 completely covers the inner surface 32. The electromagnetic shield 28 is positioned between the liner 58 and the inner surface 32 of the purse 24 corresponding to the front side 36 of the purse 24. Moreover, the electromagnetic shield 28 substantially covers the inner surface 32 corresponding to the front side 36. The electromagnetic shield 28 is comprised of a magnetic material and the electromagnetic shield 28 inhibits a magnetic field associated with the first magnets 52 from passing into the interior of the purse 24. In this way the electromagnetic shield 28 protects magnetically sensitive objects from being exposed to the magnetic field.

A first closure 60 is provided and the coupler coupled to the purse 24. The first closure 60 is positioned on the inner surface 32 and the first closure 60 is selectively manipulated. The first closure 60 is coextensive with the top end 34 such that the first closure 60 selectively closes the purse 24. The first closure 60 may comprise a zipper or the like. A pair of second closures 62 is provided and each of the second closures 62 is coupled to the inner surface 32 of the purse 24. The second closures 62 are positioned on opposite sides of the purse 24 with respect to each other and each of the second closures 62 selectively engages each other to close the purse 24.

A first coupler 64 is coupled to the first surface 44 corresponding to the first wing 46 and a second coupler 66 is coupled to the second surface 45 corresponding to the second wing 48. The first coupler 64 engages the second coupler 66 when each of the wings 26 is positioned in the stored position to retain each of the wings 26 in the stored position. Each of the first 64 and second 66 couplers may comprise complementary snaps or the like.

A strap 68 is provided and the strap 68 is removably coupled to the purse 24 to facilitate the purse 24 to be carried. The strap 68 has a first end 70 and a second end 72 and each of the first end 70 and the second end 72 is removably coupled to the inner surface 32 of the purse 24. Each of the first 70 and second 72 ends of the strap 68 may be retained on the purse 24 with a mechanical fastener such as a snap or the like.

Figure 1:
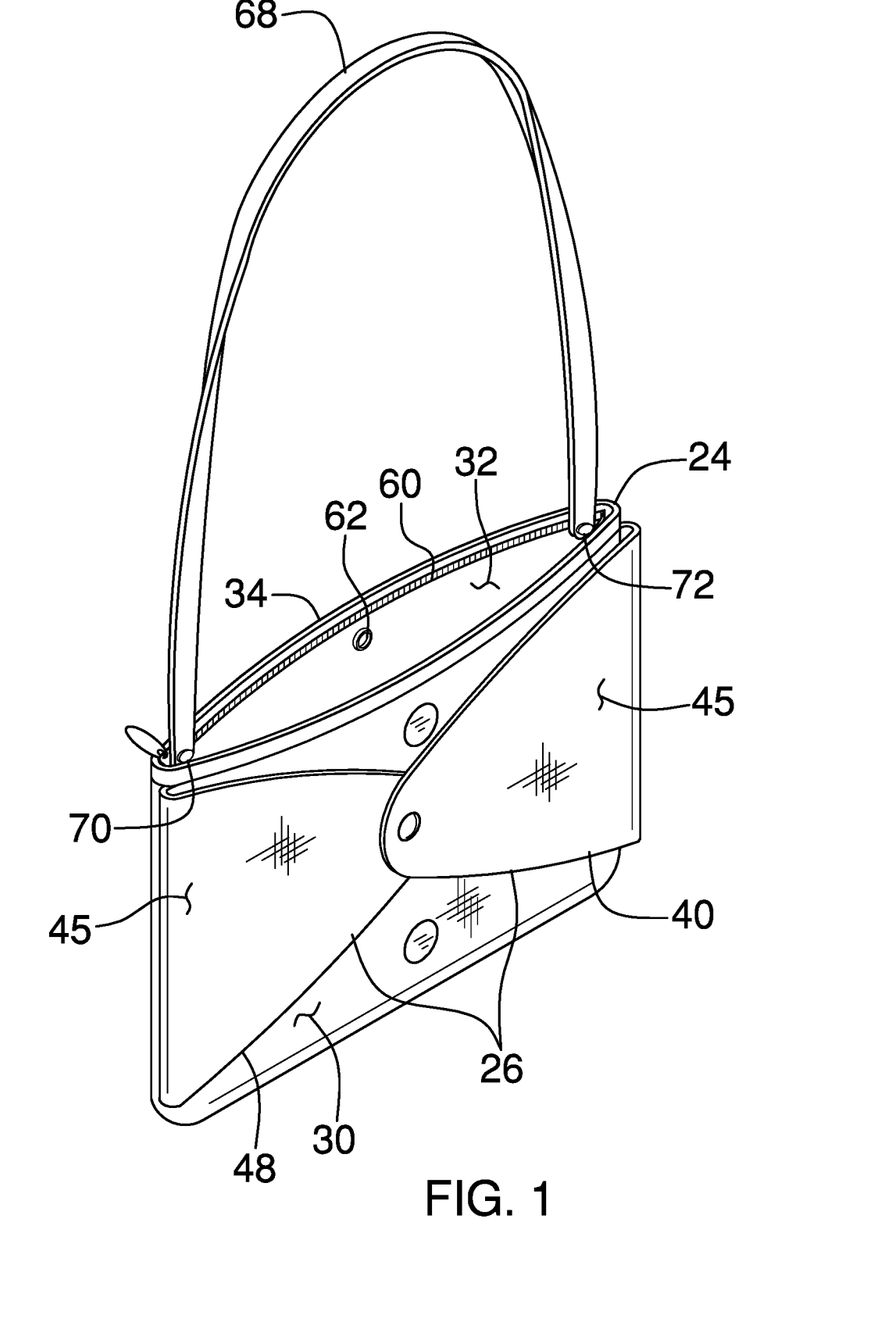
FIG. 1 is a front perspective view of a magnetic purse system according to an embodiment of the disclosure showing a pair of wings in a stored position.
Figure 2:
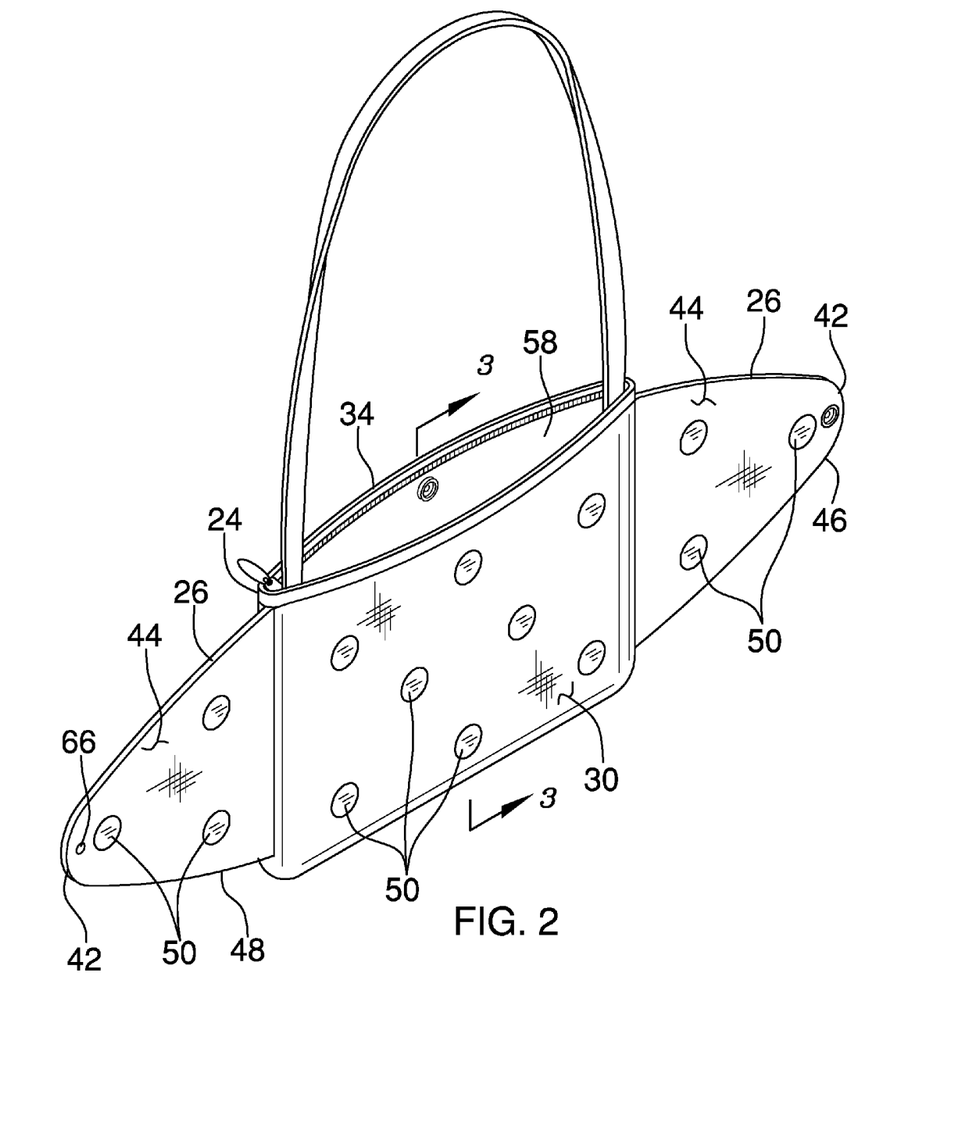
FIG. 2 is a front perspective view of an embodiment of the disclosure showing a pair of wings in a deployed position.
Figure 3:
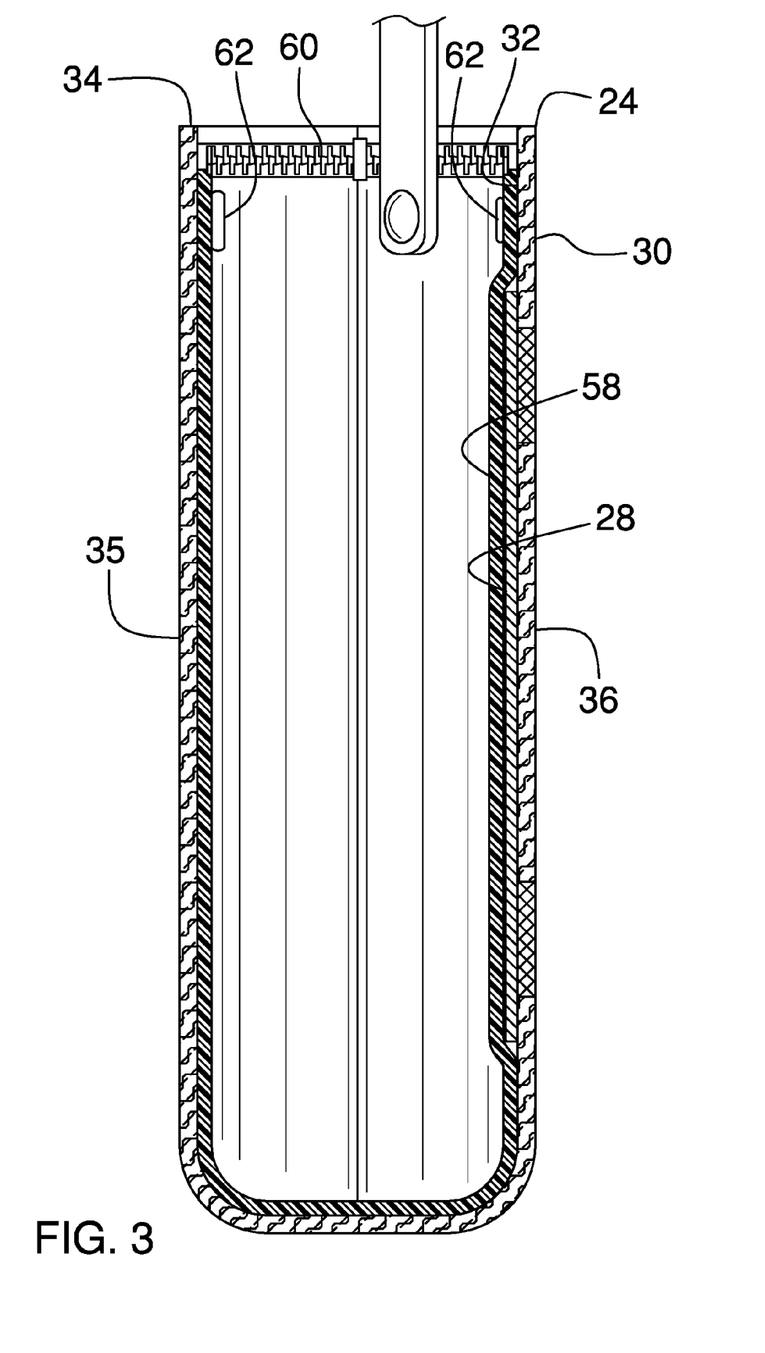
FIG. 3 is a cross sectional view taken along line 3-3 of FIG. 2 of an embodiment of the disclosure.
Figure 4:
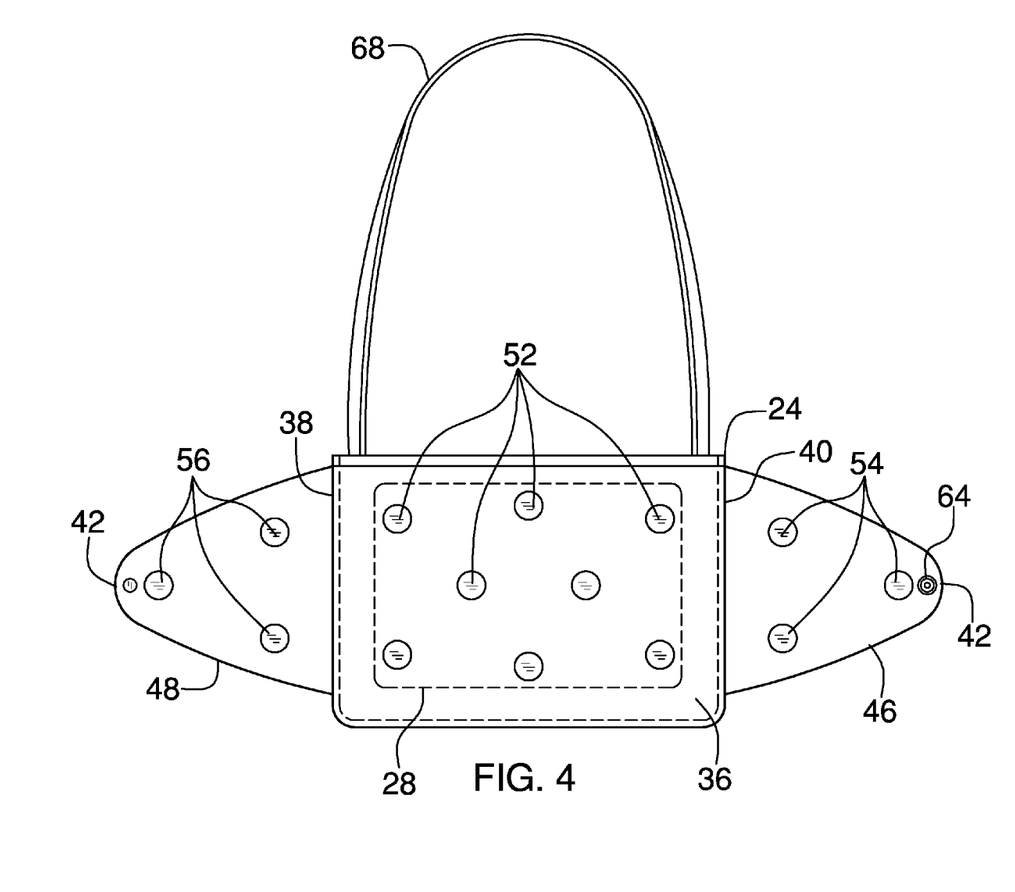
FIG. 4 is a front phantom view of an embodiment of the disclosure.
Figure 5:
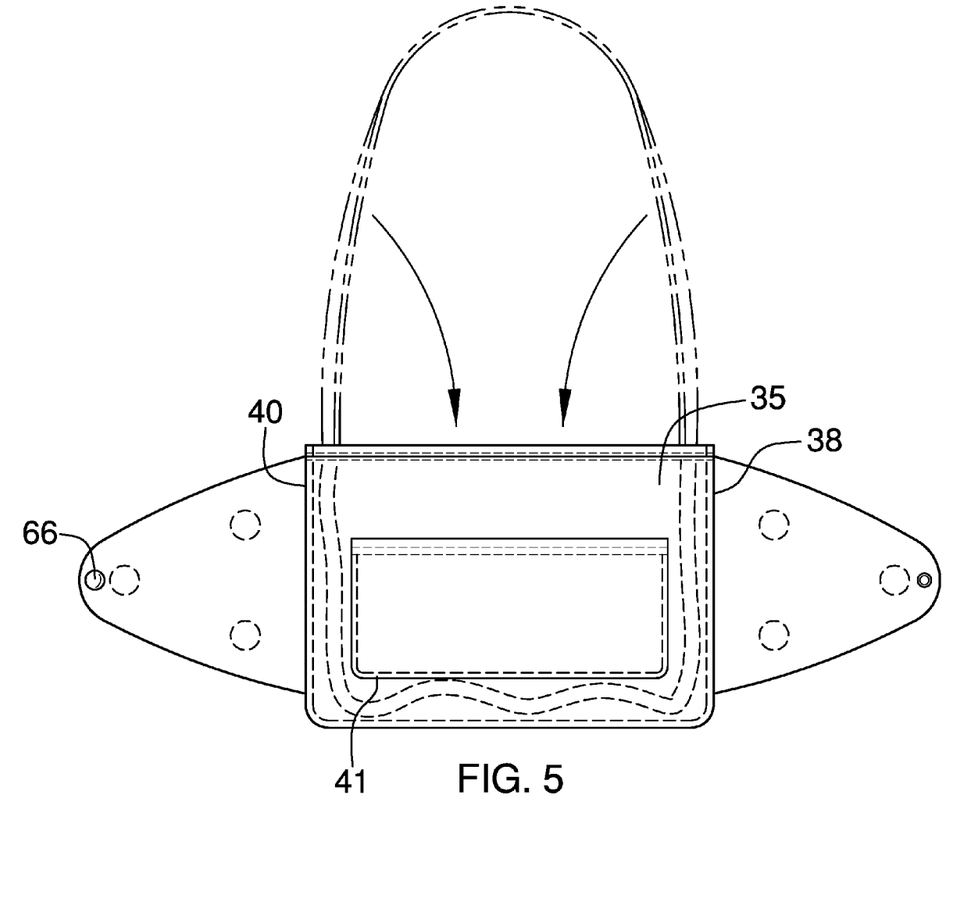
FIG. 5 is a back phantom view of an embodiment of the disclosure.
Figure 6:
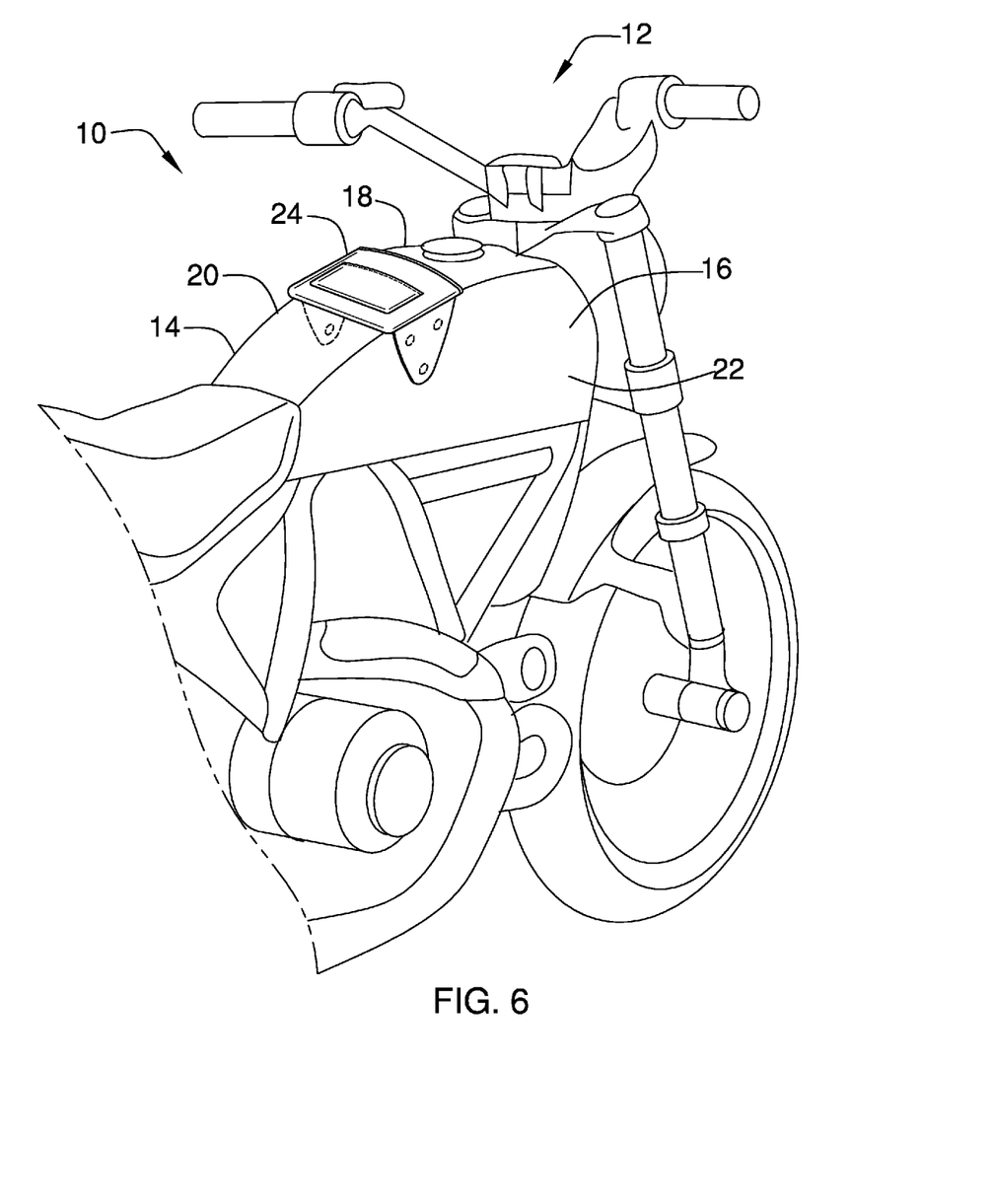
FIG. 6 is a perspective in use view of an embodiment of the disclosure.

In use, each of the wings 26 is positioned in the deployed position and the purse 24 is positioned on the gas tank 14 when the vehicle 12 is to be driven. The purse 24 is positioned on the top side 18 of the gas tank 14 and each of the wings 26 extends downwardly along an associated one of the first lateral side 20 and the second lateral side 22 of the gas tank 14. Each of the magnets 50 magnetically engages the gas tank 14 to retain the purse 24 on the gas tank 14 when the vehicle 12 is driven. The purse 24 is removed from the gas tank 14 and each of the wings 26 is positioned in the folded position. Additionally, the first coupler 64 is manipulated to engage the second coupler 66 thereby retaining each of the wings 26 in the folded position. Thus, the purse 24 is employed on the convention of purses when the vehicle 12 is not being driven.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A magnetic purse system comprising:
    a vehicle having a gas tank, said gas tank being comprised of a magnetic material;
    a purse being configured to contain objects, said purse including a pair of wings, said purse having an electromagnetic shield, said purse being selectively positioned on said gas tank when said vehicle is ridden, said purse having an outer surface, an inner surface and a top end, said top end being open to access an interior of said purse, said outer surface having a front side, a first lateral side and a second lateral side, each of said wings being foldably coupled to and extending outwardly from an associated one of said first lateral side and said second lateral side of said purse;
    a plurality of magnets, each of said magnets being coupled to said purse and each of said wings, each of said magnets magnetically engaging said gas tank when said purse is positioned on said gas tank thereby facilitating said purse to be stored when said vehicle is driven, said plurality of magnets including a set of first magnets; and
    said electromagnetic shield being positioned between said liner and said inner surface of said purse corresponding to said front side of said purse, said electromagnetic shield substantially covering said inner surface corresponding to said front side, said electromagnetic shield being comprised of a magnetic material, said electromagnetic shield inhibiting a magnetic field associated with said first magnets from passing into said interior of said purse wherein said electromagnetic shield is configured to protect magnetically sensitive objects from being exposed to said magnetic field.

2. The system according to claim 1, wherein:
    said gas tank having an outer wall, said outer wall having a top side, a first lateral side and a second lateral side; and
    each of said wings is selectively positioned in a deployed position having each of said wings extending laterally away from said purse such that each of said wings abuts an associated one of said first lateral side and said second lateral side of said gas tank when said purse is positioned on said top side of said gas tank.

3. The system according to claim 1, further comprising a liner being coupled to said purse, said liner being positioned on said inner surface of said purse, said liner completely covering said inner surface.

4. The system according to claim 1, further comprising a strap being removably coupled to said purse wherein said strap is configured to facilitate said purse to be carried, said strap having a first end an a second end, each of said first end and said second end being removably coupled to said inner surface of said purse.

5. The system according to claim 1, wherein each of said wings is selectively positioned in a stored position having each of said wings lying on said front side of said purse, each of said wings having a distal end with respect to said purse and a first surface, said pair of wings including a first wing and a second wing.

6. The system according to claim 5, wherein said plurality of magnets includes a set of second magnets and a set of third magnets, each of said first magnets being positioned on said outer surface corresponding to said front side of said purse, each of said second magnets being positioned on said first surface corresponding to said first wing, each of said third magnets being positioned on said first surface corresponding to said second wing.

7. The system according to claim 5, further comprising:
a first coupler being coupled to said first surface corresponding to said first wing; and
a second coupler being coupled to said first surface corresponding to said second wing, said first coupler engaging said second coupler when each of said wings is positioned in said stored position to retain each of said wings in said stored position.

8. A magnetic purse system comprising:
a vehicle having a gas tank, said gas tank having an outer wall, said outer wall having a top side, a first lateral side and a second lateral side, said gas tank being comprised of a magnetic material;
a purse being configured to contain objects, said purse including a pair of wings, said purse having an electromagnetic shield, said purse being selectively positioned on said gas tank when said vehicle is ridden, said purse having an outer surface, an inner surface and a top end, said top end being open to access an interior of said purse, said outer surface having a front side, a first lateral side and a second lateral side, each of said wings being foldably coupled to and extending outwardly from an associated one of said first lateral side and said second lateral side of said purse, each of said wings being selectively positioned in a deployed position having each of said wings extending laterally away from said purse such that each of said wings abuts an associated one of said first lateral side and said second lateral side of said gas tank when said purse is positioned on said top side of said gas tank, each of said wings being selectively positioned in a stored position having each of said wings lying on said front side of said purse, each of said wings having a distal end with respect to said purse and a first surface, said pair of wings including a first wing and a second wing;
a plurality of magnets, each of said magnets being coupled to said purse and each of said wings, each of said magnets magnetically engaging said gas tank when said purse is positioned on said gas tank thereby facilitating said purse to be stored when said vehicle is driven, said plurality of magnets including a set of first magnets, a set of second magnets and a set of third magnets, each of said first magnets being positioned on said outer surface corresponding to said front side of said purse, each of said second magnets being positioned on said first surface corresponding to said first wing, each of said third magnets being positioned on said first surface corresponding to said second wing;
a liner being coupled to said purse, said liner being positioned on said inner surface of said purse, said liner completely covering said inner surface;
said electromagnetic shield being positioned between said liner and said inner surface of said purse corresponding to said front side of said purse, said electromagnetic shield substantially covering said inner surface corresponding to said front side, said electromagnetic shield being comprised of a magnetic material, said electromagnetic shield inhibiting a magnetic field associated with said first magnets from passing into said interior of said purse wherein said electromagnetic shield is configured to protect magnetically sensitive objects from being exposed to said magnetic field;
a closure being coupled to said purse wherein said closure is configured to be manipulated, said closure being positioned on said inner surface, said closure being coextensive with said top end such that said closure selectively closes said purse;
a first coupler being coupled to said first surface corresponding to said first wing;
a second coupler being coupled to said first surface corresponding to said second wing, said first coupler engaging said second coupler when each of said wings is positioned in said stored position to retain each of said wings in said stored position; and
a strap being removably coupled to said purse wherein said strap is configured to facilitate said purse to be carried, said strap having a first end an a second end, each of said first end and said second end being removably coupled to said inner surface of said purse.

* * * * *